United States Patent
Tsai

(10) Patent No.: US 12,267,265 B2
(45) Date of Patent: Apr. 1, 2025

(54) APPARATUS AND METHOD FOR CONFIGURING APPLICATION OF TCI STATE TO REFERENCE SIGNAL

(71) Applicant: MEDIATEK INC., Hsin-Chu (TW)

(72) Inventor: Cheng-Rung Tsai, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 322 days.

(21) Appl. No.: 17/542,387

(22) Filed: Dec. 4, 2021

(65) Prior Publication Data

US 2022/0231807 A1 Jul. 21, 2022

Related U.S. Application Data

(60) Provisional application No. 63/137,781, filed on Jan. 15, 2021.

(51) Int. Cl.
| | |
|---|---|
| *H04W 72/04* | (2023.01) |
| *H04L 5/00* | (2006.01) |
| *H04W 72/23* | (2023.01) |
| *H04W 76/00* | (2018.01) |
| *H04W 76/27* | (2018.01) |
| *H04W 88/08* | (2009.01) |

(52) U.S. Cl.
CPC .......... *H04L 5/0048* (2013.01); *H04W 72/23* (2023.01); *H04W 76/27* (2018.02)

(58) Field of Classification Search
CPC ... H04L 5/0048; H04L 5/0091; H04L 5/0051; H04W 76/27; H04W 72/23
USPC ....................................................... 370/913
See application file for complete search history.

(56) References Cited

U.S. PATENT DOCUMENTS

| | | | |
|---|---|---|---|
| 2019/0260532 A1* | 8/2019 | Manolakos | H04L 5/0051 |
| 2020/0280409 A1* | 9/2020 | Grant | H04L 5/0044 |
| 2020/0351841 A1 | 11/2020 | Cirik et al. | H04W 72/042 |
| 2020/0383096 A1 | 12/2020 | Yang et al. | H04W 72/0426 |
| 2021/0235455 A1* | 7/2021 | Khoshnevisan | H04W 72/0453 |
| 2023/0171062 A1* | 6/2023 | Khoshnevisan | H04L 5/0085 370/329 |

FOREIGN PATENT DOCUMENTS

| | | | | |
|---|---|---|---|---|
| CN | 111096028 A | | 4/2018 | |
| EP | 4090063 A1 * | | 11/2022 | H04B 7/0608 |

OTHER PUBLICATIONS

Taiwan IPO, office action for the Taiwanese patent application 110148314 (no English translation is available), dated Oct. 13, 2022 (4 pages).

(Continued)

*Primary Examiner* — Maharishi V Khirodhar
(74) *Attorney, Agent, or Firm* — Helen Mao; Zheng Jin; Imperium Patent Works

(57) ABSTRACT

Apparatus and methods are provided for configuring application of TCI state to an RS. In one novel aspect, an RRC configuration is introduced for indicating to the UE whether to apply an indicated TCI state to an RS. In particular, a BS can transmit an RRC configuration of an RS to a UE. The UE can receive the RRC configuration from the BS. The BS can transmit an indication of one or more TCI states to the UE. The UE can receive the indication of the one or more TCI states from the BS. The UE can determine whether to apply the TCI state to the RS according to the RRC configuration.

20 Claims, 3 Drawing Sheets

(56) References Cited

OTHER PUBLICATIONS

Taiwan IPO, office action for the Taiwanese patent application 110145568 (no English translation is available) dated Apr. 18, 2022 (7 pages).
China Intellectual Property Office Action 202111488723.7, dated Dec. 18, 2023 (12 pages).
China Intellectual Property Office Action 202111559940.0, dated Dec. 23, 2023 (11 pages).
China Intellectual Property Office Action 202111488723.7, dated Mar. 29, 2024 (13 pages).

* cited by examiner

APPARATUS AND METHOD FOR CONFIGURING APPLICATION OF TCI STATE TO REFERENCE SIGNAL

CROSS REFERENCE TO RELATED APPLICATIONS

This application claims priority under 35 U.S.C. § 119 from U.S. Provisional Application No. 63/137,781, entitled "Common TCI Framework," filed on Jan. 15, 2021, the subject matter of which is incorporated herein by reference.

TECHNICAL FIELD

The disclosed embodiments relate generally to wireless communication, and, more particularly, to application of TCI state to reference signal.

BACKGROUND

In conventional network of 3rd generation partnership project (3GPP) 5G new radio (NR), the user equipment (UE) can be configured, by the base station (BS), with a plurality of transmission configuration indication (TCI) states for downlink (DL) transmission and uplink (UL) transmission. After being configured, the UE may apply one or more indicated TCI states to: (1) UE-dedicated physical downlink control channel (PDCCH) reception and corresponding physical downlink share channel (PDSCH) reception; and (2) dynamic-grant/configured-grant based physical uplink share channel (PUSCH) and all dedicated physical uplink share channel (PUCCH) resources.

In some situations, the one or more indicated TCI states may be applied to some reference signals. However, how to indicate the UE to apply the one or more indicated TCI states to some reference signals has not been discussed yet.

SUMMARY

Apparatus and methods are provided for configuring application of transmission configuration indication (TCI) state to a reference signal (RS). In one novel aspect, a radio resource control (RRC) configuration may be introduced for indicating to a user equipment (UE) whether to apply an indicated TCI state to an RS. In particular, a base station (BS) can transmit an RRC configuration of an RS to a UE. The UE can receive the RRC configuration from the BS. After the transmission of the RRC configuration, the BS can transmit an indication of one or more TCI states to the UE. The UE can receive indication of the one or more TCI states from the BS. Then, the UE can apply the one or more TCI states to the reference signal when the RRC configuration indicates to the UE to apply the TCI state to the reference signal.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
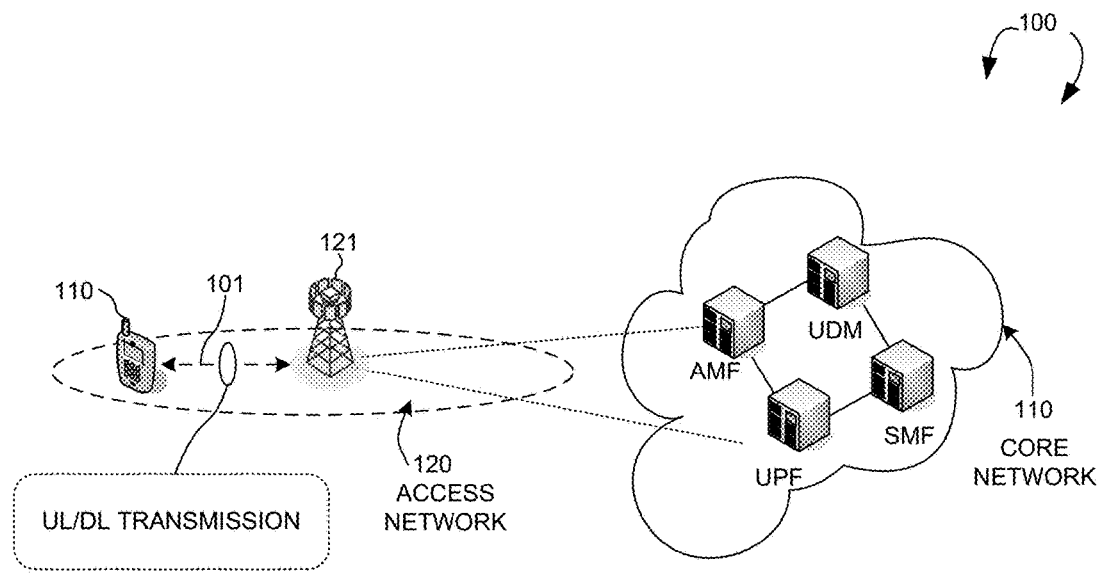
FIG. 1 illustrates an exemplary 5G new radio network supporting application of TCI state activation to reference signal in accordance with embodiments of the current invention.

FIG. 1 illustrates an exemplary 5G new radio (NR) network 100 supporting application of transmission configuration indication (TCI) state to reference signal (RS) in accordance with aspects of the current invention. The 5G NR network 100 includes a user equipment (UE) 110 communicatively connected to a gNB 121 operating in a licensed band (e.g., 30 GHz~300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include uplink (UL) transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
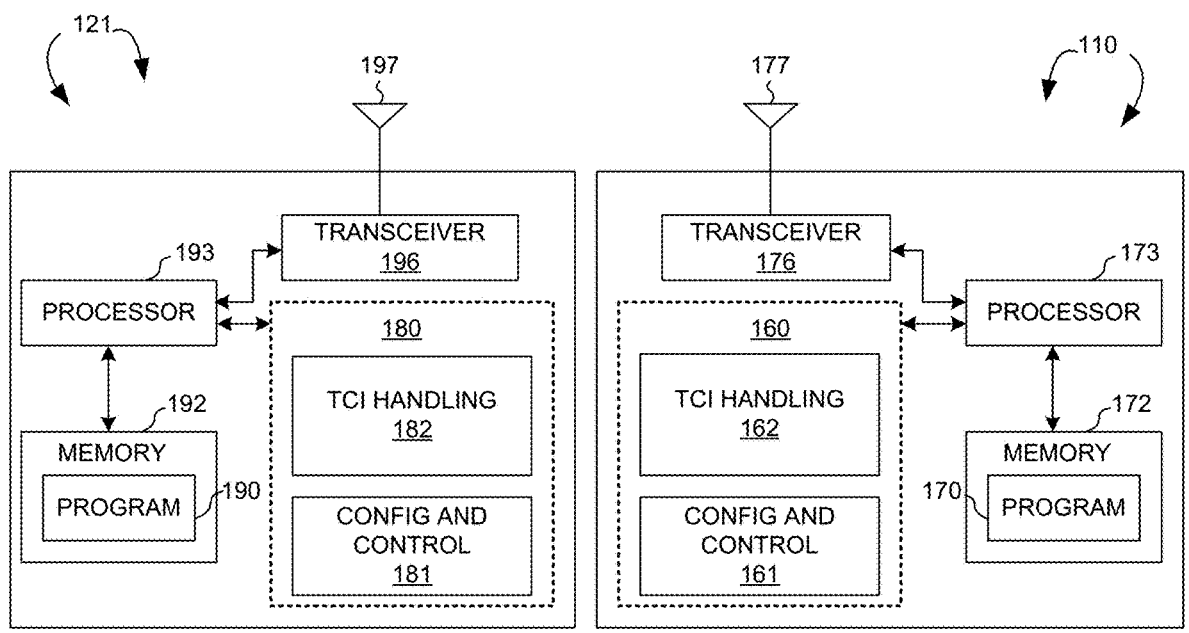
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the gNB 121. Memory 192 stores program instructions and data 190 to control the operations of the gNB 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The gNB 121 and the UE 110 also include several functional modules and circuits that can be implemented and configured to perform embodiments of the present invention. In the example of FIG. 2, the gNB 121 includes a set of control functional modules and circuit 180. TCI handling circuit 182 handles TCI state(s) and associated network parameters for the UE 110. Configuration and control circuit 181 provides different parameters to configure and control the UE 110. The UE 110 includes a set of control functional modules and circuit 160. TCI handling circuit 162 handles TCI state(s) and associated network parameters. Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3A:
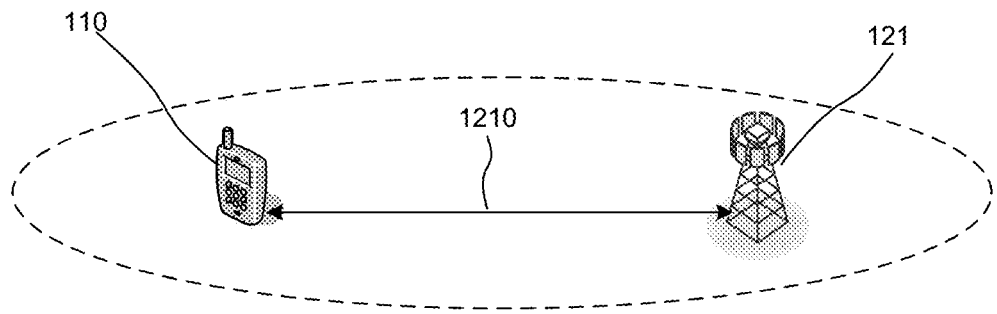
FIG. 3A illustrates one embodiment of message transmissions in accordance with embodiments of the current invention.

FIG. 3A illustrates one embodiment of message transmissions in accordance with one novel aspect. In particular, the gNB 121 transmits a higher layer configuration 1210 of a reference signal (RS) to the UE 110. The higher layer configuration 1210 indicates to the UE 110 a plurality of TCI states and indicates to the UE 110 whether to apply the plurality TCI states to the RS. The UE 110 receives the higher layer configuration 1210 from the gNB 121. In some embodiments, the higher layer configuration 1210 may include a radio resource control (RRC) configuration.

Figure 3B:
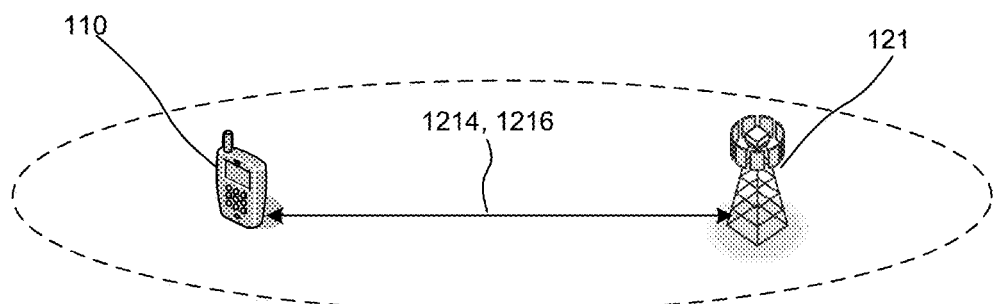
FIG. 3B illustrates one embodiment of message transmissions in accordance with embodiments of the current invention.

FIG. 3B illustrates one embodiment of message transmissions in accordance with one novel aspect. In particular, after the transmission of the higher layer configuration 1210, the gNB 121 transmits a configuration 1214 to the UE 110. The configuration 1214 includes an indication 1216 of one or more indicated TCI states of the plurality of TCI states. The UE 110 receives the configuration 1214. In some embodiments, the configuration 1214 may include a downlink control information (DCI). In some embodiments, the configuration 1214 may include a media access control-control element (MAC-CE).

Then, the UE 110 can determine whether to apply the one or more indicated TCI states to the RS according to the higher layer configuration 1210. In some embodiments, the higher layer configuration 1210 of the RS indicates to the UE 110 to apply the one or more indicated TCI states to the RS. Therefore, the UE 110 applies the one or more indicated TCI states to the RS. In some embodiments, the higher layer configuration 1210 indicates to the UE 110 not to apply the one or more indicated TCI states to the RS. Therefore, the UE 110 determines to transmit the RS without applying the one or more indicated TCI states to the RS.

In some embodiments, the RS may include a channel state information-RS (CSI-RS). In some cases, the higher layer configuration 1210 may include a parameter (e.g., an RRC parameter) for a CSI-RS resource configuration to indicate to the UE 110 to apply the one or more indicated TCI states to the CSI-RS. In some cases, the higher layer configuration 1210 may include a parameter (e.g., an RRC parameter) for a CSI-RS set resource configuration to indicate to the UE 110 to apply the one or more indicated TCI states to a CSI-RS set.

In some embodiments, the RS may include a sounding RS (SRS). In some cases, the higher layer configuration 1210 may include a parameter (e.g., an RRC parameter) for an SRS resource configuration to indicate to the UE 110 to apply the one or more indicated TCI states to the SRS. In some cases, the higher layer configuration 1210 may include a parameter (e.g., an RRC parameter) for an SRS set resource configuration to indicate to the UE 110 to apply the one or more indicated TCI states to an SRS set.

In some embodiments, the RS may include a first demodulation reference signal (DMRS) of a PDCCH on a control resource set (CORESET) and a second DMRS of a PDSCH corresponding to the PDCCH. The higher layer configuration 1210 may include a parameter (e.g., an RRC parameter) for a CORESET configuration to indicate to the UE 110 to apply the one or more TCI states to the first DMRS of the PDCCH on the CORESET and the second DMRS of the PDSCH corresponding to the PDCCH.

Figure 4:
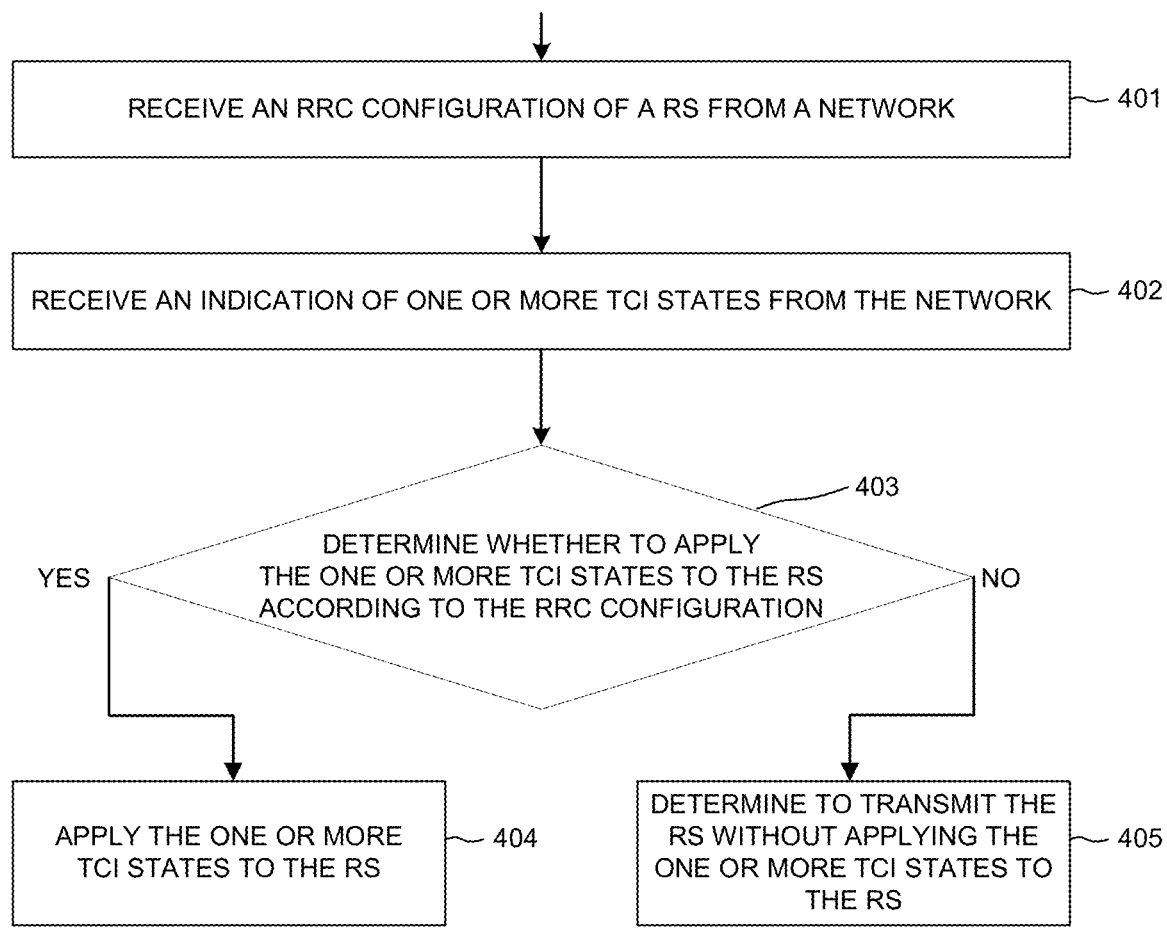
FIG. 4 is a flow chart of a method of configuring application of TCI state to reference signal in accordance with embodiments of the current invention.

FIG. 4 is a flow chart of a method of configuring application of TCI state to RS from UE perspective in a 5G/NR network in accordance with one novel aspect. In step 401, a UE receives an RRC configuration of an RS from a network. In step 402, the UE receives an indication of one or more TCI states from the network. In step 403, the UE determines whether to apply the one or more TCI states to the RS according to the RRC.

When the RRC configuration indicates to the UE to apply the one or more TCI states to the RS, in step 404, the UE applies the one or more TCI states to the RS. When the RRC configuration indicates to the UE not to apply the one or more TCI states to the RS, in step 405, the UE determines to transmit the RS without applying the one or more TCI states to the RS.

Figure 5:
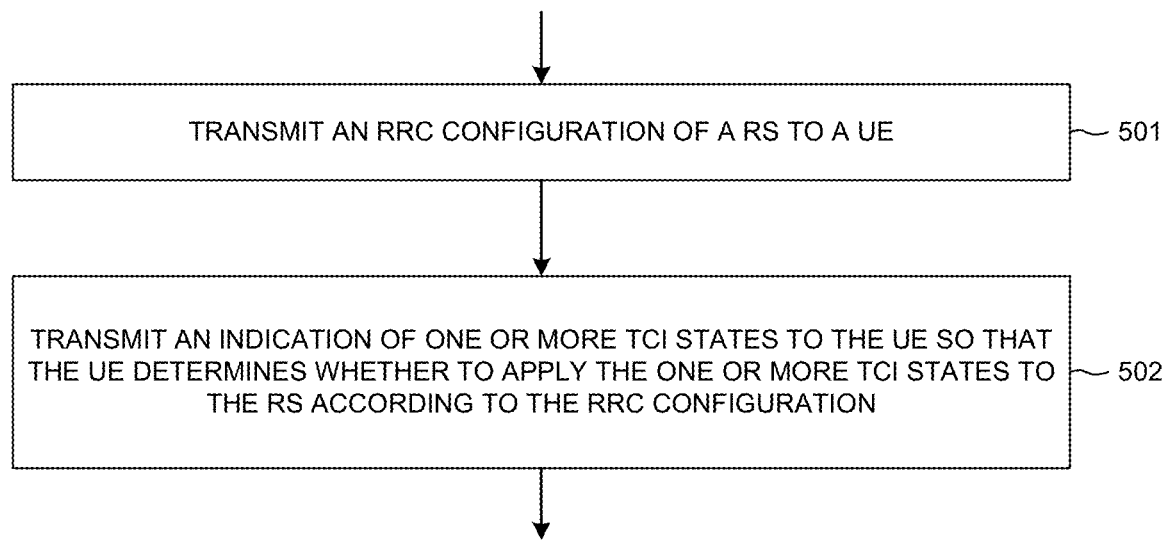
FIG. 5 is a flow chart of a method of configuring application of TCI state to reference signal in accordance with embodiments of the current invention.

FIG. 5 is a flow chart of a method of configuring application of TCI state to RS from BS perspective in a 5G/NR network in accordance with one novel aspect. In step 501, the BS transmits an RRC configuration of an RS to a UE. In step 502, the BS transmits an indication of one or more TCI states to the UE so that the UE determines whether to apply the TCI state to the RS according to the RRC configuration of the RS.

In some embodiments, the indication is included in a DCI or a MAC-CE. The RS includes: (1) a CSI-RS; (2) an SRS; or (3) a first DMRS of a PDCCH on a CORESET and a second DMRS of a PDSCH corresponding to the PDCCH.

When the RS includes the CSI-RS, the RRC configuration may include: (1) an RRC parameter for a CSI-RS resource configuration to indicate to the UE to apply the one or more TCI states to the CSI-RS; or (2) an RRC parameter for a CSI-RS set resource configuration to indicate to the UE to apply the one or more TCI states to a CSI-RS set.

When the RS includes the SRS, the RRC configuration may include: (1) an RRC parameter for an SRS resource configuration to indicate to the UE to apply the one or more TCI states to the SRS; or (2) an RRC parameter for an SRS set resource configuration to indicate to the UE to apply the one or more TCI states to an SRS set.

When the RS includes the first DMRS of the PDCCH on the CORESET and the second DMRS of the PDSCH corresponding to the PDCCH, the RRC configuration may include an RRC parameter for a CORESET configuration to indicate to the UE to apply the one or more TCI states to the first DMRS of the PDCCH on the CORESET and the second DMRS of the PDSCH corresponding to the PDCCH.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a user equipment (UE), a radio resource control (RRC) configuration of a reference signal (RS) from a network;
   receiving, by the UE, an indication of one or more transmission configuration indication (TCI) states from the network; and
   applying, by the UE, the one or more TCI states to the RS when the RRC configuration of the RS indicates to the UE to apply the one or more TCI states to the reference signal.

2. The method of claim 1, wherein the indication is included in a downlink control information (DCI) or a media access control-control element (MAC-CE).

3. The method of claim 1, wherein the reference signal includes a channel state information-reference signal (CSI-RS) or a sounding reference signal (SRS).

4. The method of claim 3, wherein the RRC configuration includes an RRC parameter for a CSI-RS resource configuration or an SRS resource configuration to indicate to the UE to apply the one or more TCI states to the CSI-RS or SRS resource.

5. The method of claim 3, wherein the RRC configuration includes an RRC parameter for a CSI-RS resource set configuration or an SRS resource set configuration to indicate to the UE to apply the one or more TCI states to a CSI-RS set or an SRS resource set.

6. The method of claim 1, wherein the reference signal includes a first demodulation reference signal (DMRS) of a physical downlink control channel (PDCCH) on a control resource set (CORESET) and a second DMRS of a physical downlink share channel (PDSCH) corresponding to the PDCCH.

7. The method of claim 6, wherein the RRC configuration includes an RRC parameter for a CORESET configuration to indicate to the UE to apply the one or more TCI states to the first DMRS of the PDCCH on the CORESET and the second DMRS of the PDSCH corresponding to the PDCCH.

8. A method, comprising:
   transmitting, by a base station (BS), a radio resource control (RRC) configuration of a reference signal (RS) to a user equipment (UE); and
   transmitting, by the BS, an indication of one or more transmission configuration indication (TCI) states to the UE so that the UE applies the one or more TCI states to the RS when the RRC configuration of the RS indicates to the UE to apply the one or more TCI states to the reference signal.

9. The method of claim 8, wherein the reference signal includes a channel state information-reference signal (CSI-RS) or a sounding reference signal (SRS).

10. The method of claim 9, wherein the RRC configuration includes an RRC parameter for a CSI-RS resource configuration or an SRS resource configuration to indicate to the UE to apply the one or more TCI states to the CSI-RS or SRS resource.

11. The method of claim 9, wherein the RRC configuration includes an RRC parameter for a CSI-RS set resource configuration or an SRS resource set configuration to indicate to the UE to apply the one or more TCI states to a CSI-RS set or an SRS resource set.

12. The method of claim 8, wherein the reference signal includes a first demodulation reference signal (DMRS) of a physical downlink control channel (PDCCH) on a control resource set (CORESET) and a second DMRS of a physical downlink share channel (PDSCH) corresponding to the PDCCH.

13. The method of claim 12, wherein the RRC configuration includes an RRC parameter for a CORESET configuration to indicate to the UE to apply the one or more TCI states to the first DMRS of the PDCCH on the CORESET and the second DMRS of the PDSCH corresponding to the PDCCH.

14. A user equipment (UE) comprising:
   a transceiver that:
      receives a radio resource control (RRC) configuration of a reference signal (RS) from a network; and
      receives an indication of one or more transmission configuration indication (TCI) states from the network;
   a TCI handling circuit that:
      applies the one or more TCI states to the RS when the RRC configuration of the RS indicates to the UE to apply the one or more TCI states to the reference signal.

15. The UE of claim 14, wherein the indication is included in a downlink control information (DCI) or a media access control-control element (MAC-CE).

16. The UE of claim 14, wherein the reference signal includes a channel state information-reference signal (CSI-RS) or a sounding reference signal (SRS).

17. The UE of claim 16, wherein the RRC configuration includes an RRC parameter for a CSI-RS resource configuration or an SRS resource configuration to indicate to the UE to apply the one or more TCI states to the CSI-RS or SRS resource.

18. The UE of claim 16, wherein the RRC configuration includes an RRC parameter for a CSI-RS set resource configuration or an SRS resource set configuration to indicate to the UE to apply the one or more TCI states to a CSI-RS set or an SRS resource set.

19. The UE of claim 14, wherein the reference signal includes a first demodulation reference signal (DMRS) of a physical downlink control channel (PDCCH) on a control resource set (CORESET) and a second DMRS of a physical downlink share channel (PDSCH) corresponding to the PDCCH.

20. The UE of claim 19, wherein the RRC configuration includes an RRC parameter for a CORESET configuration to indicate to the UE to apply the one or more TCI states to the first DMRS of the PDCCH on the CORESET and the second DMRS of the PDSCH corresponding to the PDCCH.

* * * * *